US011057960B2

(12) United States Patent
Fujishiro et al.

(10) Patent No.: US 11,057,960 B2
(45) Date of Patent: Jul. 6, 2021

(54) RADIO TERMINAL AND BASE STATION

(71) Applicant: KYOCERA CORPORATION, Kyoto (JP)

(72) Inventors: Masato Fujishiro, Yokohama (JP); Mayumi Komura, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/268,712

(22) Filed: Feb. 6, 2019

(65) Prior Publication Data
US 2019/0182889 A1 Jun. 13, 2019

Related U.S. Application Data

(63) Continuation of application No. PCT/JP2017/028199, filed on Aug. 3, 2017.

(60) Provisional application No. 62/372,925, filed on Aug. 10, 2016.

(51) Int. Cl.
H04W 76/27 (2018.01)
H04W 76/30 (2018.01)
H04W 52/02 (2009.01)
H04W 4/02 (2018.01)

(52) U.S. Cl.
CPC .......... *H04W 76/30* (2018.02); *H04W 4/027* (2013.01); *H04W 52/0216* (2013.01); *H04W 76/27* (2018.02); *Y02D 30/70* (2020.08)

(58) Field of Classification Search
None
See application file for complete search history.

(56) References Cited

U.S. PATENT DOCUMENTS

| 2013/0039339 | A1* | 2/2013 | Rayavarapu | H04W 76/19 370/331 |
| 2013/0260740 | A1* | 10/2013 | Rayavarapu | H04W 76/27 455/422.1 |
| 2014/0220981 | A1* | 8/2014 | Jheng | H04W 72/02 455/437 |
| 2014/0376435 | A1 | 12/2014 | Morioka et al. | |

(Continued)

FOREIGN PATENT DOCUMENTS

JP 2013-197604 A 9/2013
JP 2015-213311 A 11/2015

OTHER PUBLICATIONS

Intel Corporation; "Light connection DRX paging cycle and mechanism", 3GPP TSG RAN WG2 Meeting #94, R2-163632, May 23-27, 2016; pp. 1-5; Nanjing, China.

(Continued)

*Primary Examiner* — Jenkey Van
(74) *Attorney, Agent, or Firm* — Studebaker & Brackett PC

(57) ABSTRACT

A user equipment for a mobile communication system, includes: a receiver configured to receive, from a base station, an RRC (Radio Resource Control) connection release message including information instructing a transition to a specific state; and a controller configured to cause the user equipment to transit to the specific state in response to receiving the RRC connection release message including the information. The specific state is a different RRC state from an RRC connected and an RRC idle, and a connection for the user equipment is maintained between the base station and a core network.

2 Claims, 10 Drawing Sheets

(56) References Cited

U.S. PATENT DOCUMENTS

| | | | |
|---|---|---|---|
| 2015/0304955 A1 | 10/2015 | Manepalli et al. | |
| 2016/0095065 A1* | 3/2016 | Richards | H04W 52/0235 |
| | | | 370/311 |
| 2017/0127473 A1* | 5/2017 | Virtej | H04W 76/27 |
| 2017/0311278 A1* | 10/2017 | Adjakple | H04W 60/00 |
| 2017/0311290 A1* | 10/2017 | Adjakple | H04W 76/18 |
| 2017/0332419 A1* | 11/2017 | Kim | H04L 1/1861 |
| 2017/0359747 A1* | 12/2017 | Lunden | H04L 27/2613 |
| 2019/0028860 A1* | 1/2019 | Futaki | H04W 48/18 |
| 2019/0037629 A1* | 1/2019 | Ryu | H04W 8/08 |
| 2019/0045482 A1* | 2/2019 | Lee | H04W 76/27 |
| 2019/0124620 A1* | 4/2019 | Liang | H04W 76/27 |
| 2019/0166576 A1* | 5/2019 | Kim | H04W 36/08 |

OTHER PUBLICATIONS

LG Electronics; "General considerations on lightweight connection", 3GPP TSG RAN WG2 Meeting #94, R2-164271, May 23-27, 2016; pp. 1-2; Nanjing, China.

Intel Corporation; "Benefits of RAN based paging", 3GPP TSG RAN WG3 Meeting #92, R3-161082, May 23-27, 2016; pp. 1-8; Nanjing, China.

\* cited by examiner

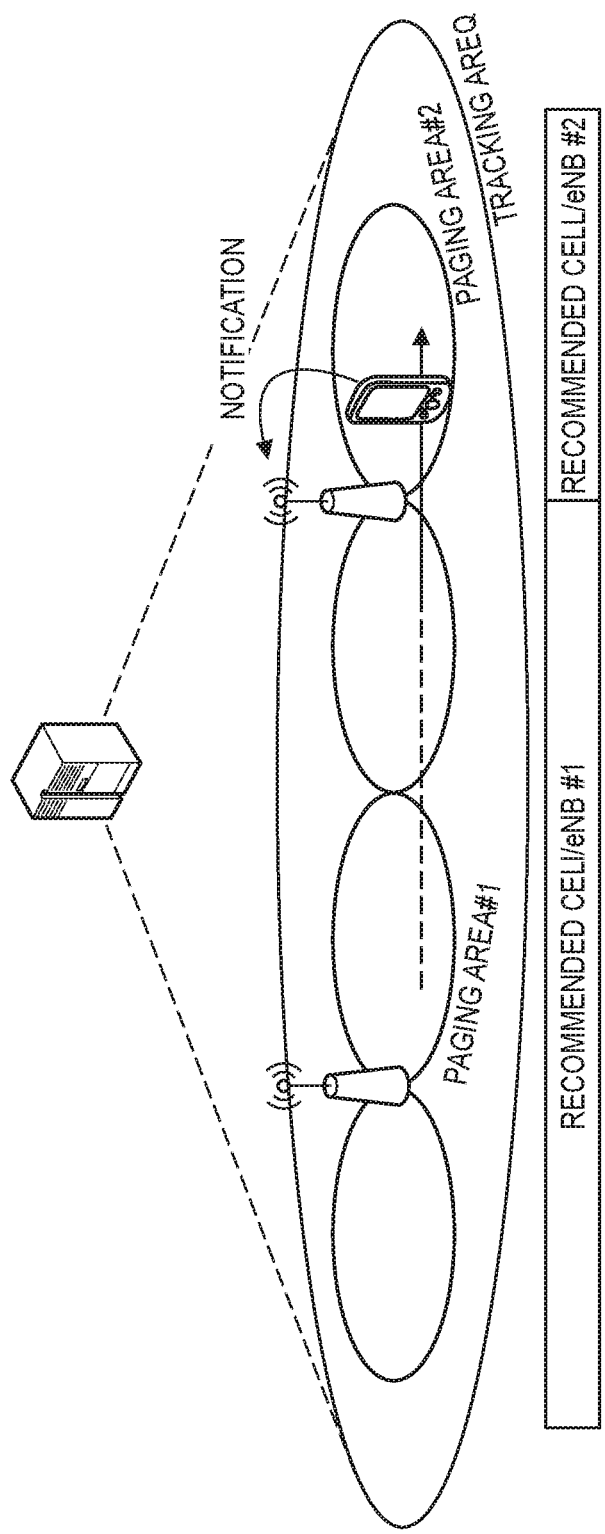

US 11,057,960 B2

RADIO TERMINAL AND BASE STATION

RELATED APPLICATION

This application is a continuation application of international application PCT/JP2017/028199, filed Aug. 3, 2017, which claims the benefit of U.S. Provisional Application No. 62/372,925, filed Aug. 10, 2016, the entire contents of which are incorporated herein by reference.

TECHNICAL FIELD

The present disclosure relates to a radio terminal and a base station that are used in a mobile communication system.

BACKGROUND ART

In recent years, with the spread of radio terminals such as smartphones capable of executing a lot of applications, the frequency at which a radio terminal connects to a network and the frequency at which a network performs paging of a radio terminal are increasing.

Therefore, in a mobile communication system, network load accompanying signaling is increasing. In view of such a situation, techniques for reducing signaling are being studied in the 3rd Generation Partnership Project (3GPP), which is the standardization project for mobile communication systems.

SUMMARY

A radio terminal according to a first aspect is a radio terminal for a mobile communication system. The radio terminal includes a controller configured to receive a message from a base station and change a configuration according to the reception of the message. The controller is configured to transition the radio terminal to a specific state in response to the fact that information instructing a transition to the specific state is included in the message. The specific state is a state in which at least one function of generating signaling with the base station among a plurality of functions of the radio terminal is deactivated while maintaining an RRC connection.

A base station according to a second aspect is a base station for a mobile communication system. The base station includes a controller configured to cause a radio terminal to change a configuration by transmitting a message to the radio terminal. The controller is configured to transition the radio terminal to a specific state by including information instructing a transition to the specific state in the message. The specific state is a state in which at least one function of generating signaling with the base station among a plurality of functions of the radio terminal is deactivated while maintaining an RRC connection.

A user equipment according to a third aspect is a user equipment for a mobile communication system. The user equipment includes: a receiver configured to receive, from a base station, an RRC (Radio Resource Control) connection release message including information instructing a transition to a specific state; and a controller configured to cause the user equipment to transit to the specific state in response to receiving the RRC connection release message including the information. The specific state is a different RRC state from an RRC connected and an RRC idle, and a connection for the user equipment is maintained between the base station and a core network.

A base station according to a fourth aspect is a base station for a mobile communication system. The base station includes a transmitter configured to cause a user equipment to transit to a specific state by transmitting, to the user equipment, an RRC (Radio Resource Control) connection release message including information instructing a transition to the specific state. The specific state is a different RRC state from an RRC connected and an RRC idle, and a connection for the user equipment is maintained between the base station and a core network.

A radio terminal according to a fifth aspect is a radio terminal for a mobile communication system. The radio terminal includes a controller configured to detect interruption of data communication with a base station and transmit a notification indicating the interruption of the data communication to the base station in response to the detection of the interruption of the data communication. The controller is configured to transmit the notification to the base station by signaling of an RRC layer. The controller is configured to detect the interruption of the data communication based on information of a layer higher than the RRC layer.

A base station according to a sixth aspect is a base station for a mobile communication system. The base station includes a controller configured to receive, from a radio terminal, mobility status information related to a moving speed of the radio terminal and determine a range of a predetermined paging area including at least one cell based on the mobility status information. The predetermined paging area is an area narrower than a tracking area and in which paging is controlled by a radio access network including the base station.

BRIEF DESCRIPTION OF DRAWINGS

FIG. 12 is a diagram illustrating a paging area and a recommended cell according to Supplementary Note 2.

DESCRIPTION OF EMBODIMENTS (Architecture of Mobile Communication System)

Figure 1:
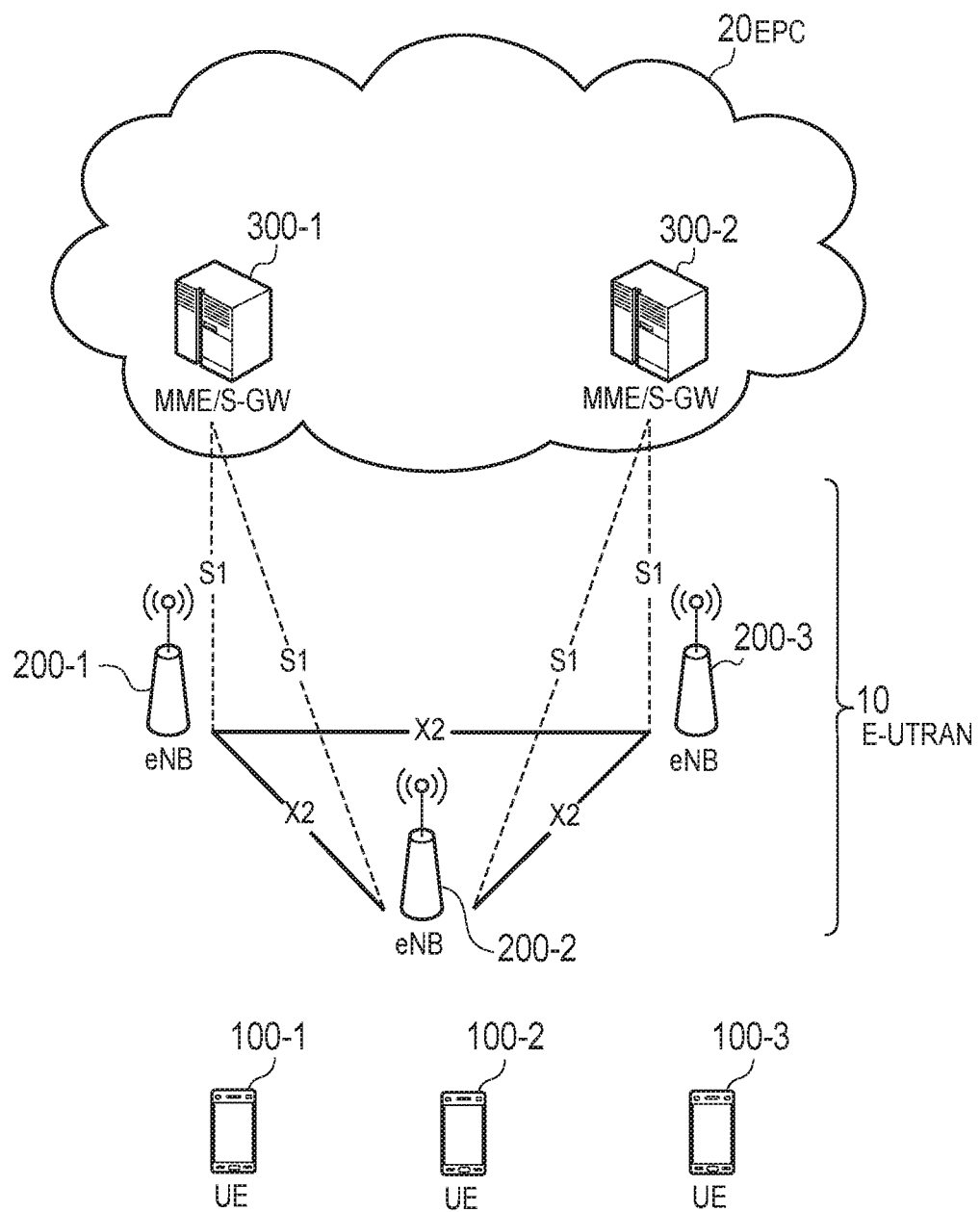
FIG. 1 is a diagram illustrating an architecture of an LTE system according to an embodiment.

Hereinafter, an architecture of a mobile communication system according to an embodiment will be described. FIG. 1 is a diagram illustrating an architecture of a Long Term Evolution (LTE) system that is the mobile communication system according to an embodiment. The LTE system is a mobile communication system based on the 3GPP standard.

As illustrated in FIG. 1, the LTE system includes a radio terminal (user equipment (UE)) 100, a radio access network (evolved-UMTS terrestrial radio access network (E-UTRAN)) 10, and an evolved packet core (EPC) 20.

The UE 100 is a mobile communication apparatus and performs radio communication with an eNB 200 that manages a cell (serving cell) in which the UE 100 exists.

The E-UTRAN 10 includes a base station (evolved Node-B (eNB)) 200. The eNBs 200 are connected to each other via an X2 interface. The eNB 200 manages one or more cells and performs radio communication with the UE 100 that has established connection to the cell. The eNB 200 has a radio resource management (RRM) function, a user data (hereinafter, simply referred to as "data") routing function, a measurement control function for mobility control and scheduling, and the like. The "cell" is used as the term indicating the smallest unit of the radio communication area and is also used as the term indicating the function or resource of performing radio communication with the UE 100.

Figure 6:
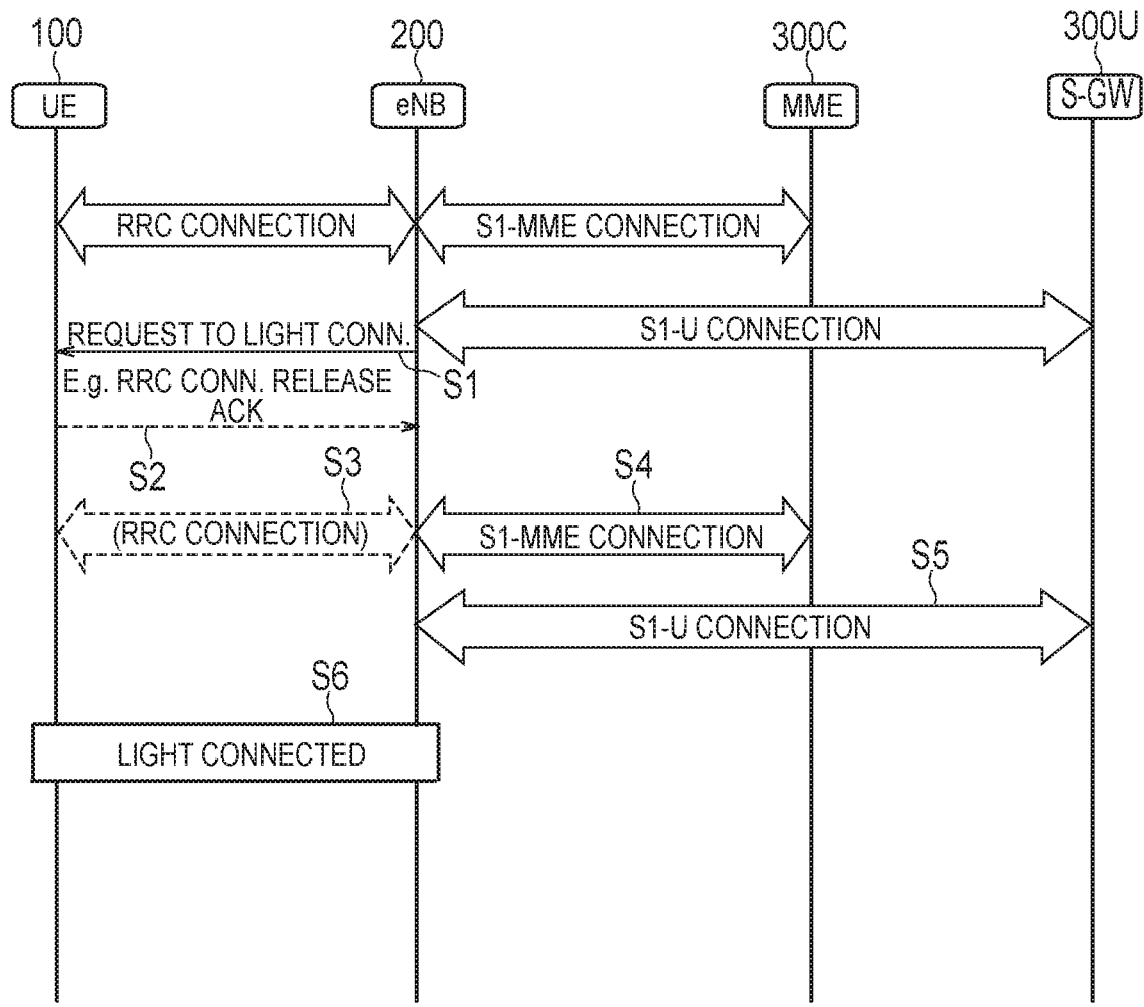
FIG. 6 is a diagram illustrating an overview of an operation related to a transition to a light connected state (specific state) according to an embodiment.

The EPC 20 includes a mobility management entity (MME) 300C and a serving gateway (S-GW) 300U (see FIG. 6 or the like). The MME 300C performs various types of mobility control or the like on the UE 100. The MME 300C communicates with the UE 100 by using non-access stratum (NAS) signaling to manage information of a tracking area in which the UE 100 exists. The tracking area is an area provided with a plurality of cells. The S-GW 300U performs data transfer control. The MME 300C and the S-GW 300U are connected to the eNB 200 via an S1 interface.

Figure 2:
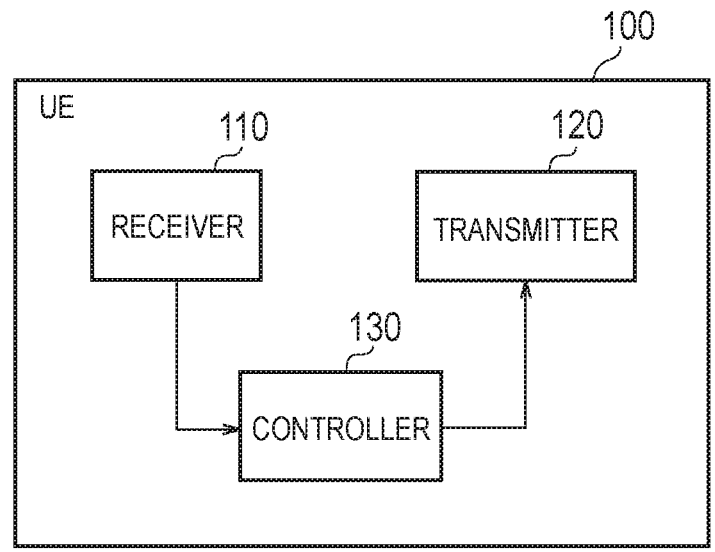
FIG. 2 is a diagram illustrating an architecture of a UE (radio terminal) according to an embodiment.

FIG. 2 is a diagram illustrating the architecture of the UE 100 (radio terminal). As illustrated in FIG. 2, the UE 100 includes a receiver 110, a transmitter 120, and a controller 130.

The receiver 110 performs a variety of reception under the control of the controller 130. The receiver 110 includes an antenna and a receiving machine. The receiving machine converts a radio signal received by the antenna into a baseband signal (reception signal) and outputs the baseband signal to the controller 130.

The transmitter 120 performs a variety of transmission under the control of the controller 130. The transmitter 120 includes an antenna and a transmitting machine. The transmitting machine converts a baseband signal (transmission signal) output by the controller 130 into a radio signal and transmits the radio signal from the antenna.

The controller 130 performs a variety of control on the UE 100. The controller 130 includes at least one processor and a memory. The memory stores a program executed by the processor and information used for processing by the processor. The processor may include a baseband processor that performs modulation and demodulation, coding and decoding, and the like of the baseband signal, and a central processing unit (CPU) that performs a variety of processes by executing a program stored in the memory. The processor performs a process to be described later.

Figure 3:
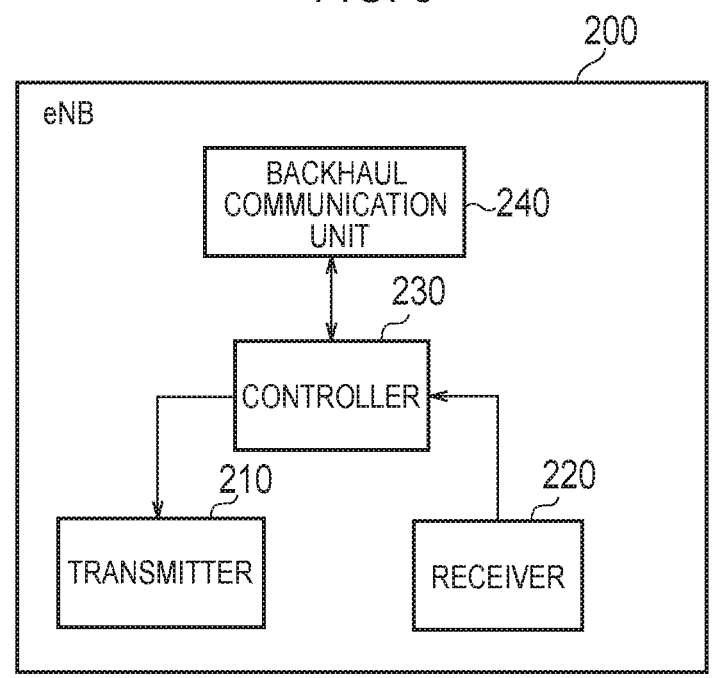
FIG. 3 is a diagram illustrating an architecture of an eNB (base station) according to an embodiment.

FIG. 3 is a diagram illustrating the architecture of the eNB 200 (base station). As illustrated in FIG. 3, the eNB 200 includes a transmitter 210, a receiver 220, a controller 230, and a backhaul communication unit 240.

The transmitter 210 performs a variety of transmission under the control of the controller 230. The transmitter 210 includes an antenna and a transmitting machine. The transmitting machine converts a baseband signal (transmission signal) output by the controller 230 into a radio signal and transmits the radio signal from the antenna.

The receiver 220 performs a variety of reception under the control of the controller 230. The receiver 220 includes an antenna and a receiving machine. The receiving machine converts a radio signal received by the antenna into a baseband signal (reception signal) and outputs the baseband signal to the controller 230.

The controller 230 performs a variety of control on the eNB 200. The controller 230 includes at least one processor and a memory. The memory stores a program executed by the processor and information used for processing by the processor. The processor may include a baseband processor that performs modulation and demodulation, coding and decoding, and the like of the baseband signal, and a CPU that performs a variety of processes by executing a program stored in the memory. The processor performs a process to be described later.

The backhaul communication unit 240 is connected to the neighbor eNB via an X2 interface and connected to the MME/S-GW 300 via an S1 interface. The backhaul communication unit 240 is used for communication performed on the X2 interface, communication performed on the S1 interface, and the like.

Figure 4:
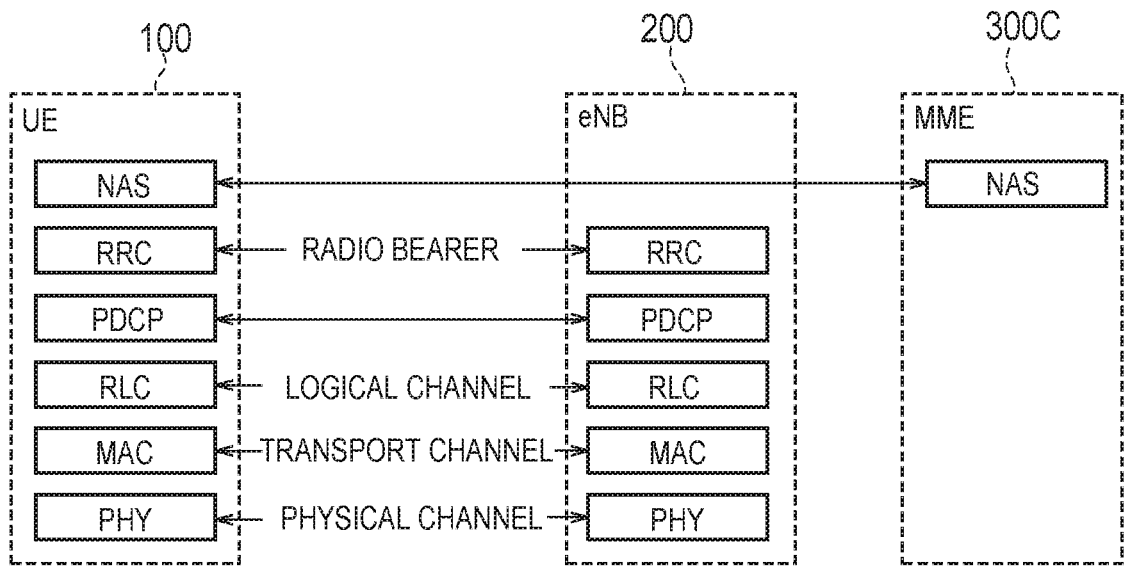
FIG. 4 is a diagram illustrating an architecture of a protocol stack of a radio interface in an LTE system according to an embodiment.

FIG. 4 is a diagram illustrating the architecture of the protocol stack of the radio interface in the LTE system. As illustrated in FIG. 4, a radio interface protocol is divided into a first layer to a third layer of an OSI reference model, and the first layer is a physical (PHY) layer. The second layer includes a medium access control (MAC) layer, a radio link control (RLC) layer, and a packet data convergence protocol (PDCP) layer. The third layer includes a radio resource control (RRC) layer. The PHY layer, the MAC layer, the RLC layer, the PDCP layer, and the RRC layer constitute an access stratum (AS) layer.

The PHY layer performs coding and decoding, modulation and demodulation, antenna mapping and demapping, and resource mapping and demapping. Data and control information are transmitted between the PHY layer of the UE 100 and the PHY layer of the eNB 200 via a physical channel.

The MAC layer performs priority control of data, a retransmission process by hybrid ARQ (HARQ), a random access procedure, and the like. Data and control information are transmitted between the MAC layer of the UE 100 and the MAC layer of the eNB 200 via a transport channel. The MAC layer of the eNB 200 includes a scheduler that determines uplink and downlink transport formats (transport block size, modulation and coding scheme (MCS)) and resource blocks allocated to the UE 100.

The RLC layer transmits data to the RLC layer on the receiving side by using the functions of the MAC layer and the PHY layer. Data and control information are transmitted between the RLC layer of the UE 100 and the RLC layer of the eNB 200 via a logical channel.

The PDCP layer performs header compression and decompression, and encryption and decryption.

The RRC layer is defined only in a control plane that handles the control information. RRC signaling for various configurations is transmitted between the RRC layer of the UE 100 and the RRC layer of the eNB 200. The RRC layer controls logical channels, transport channels, and physical channels in response to establishment, re-establishment, and release of radio bearers. If there is a connection (RRC connection) between the RRC of the UE 100 and the RRC of the eNB 200, the UE 100 is in an RRC connected mode; otherwise, the UE 100 is in an RRC idle mode.

A NAS layer, which is located above the RRC layer, performs session management, mobility management, and the like. NAS signaling is transmitted between the NAS layer of the UE 100 and the NAS layer of the MME 300C. It should be noted that the UE 100 has a function such as an application layer in addition to the protocol of the radio interface.

Figure 5:
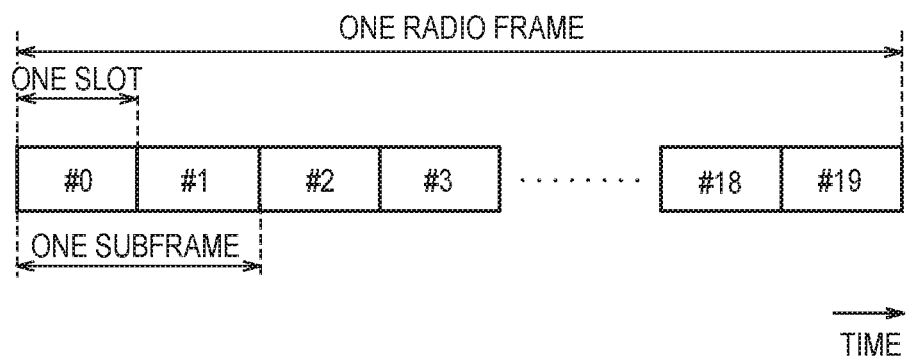
FIG. 5 is a diagram illustrating an architecture of a radio frame used in an LTE system according to an embodiment.

FIG. 5 is a diagram illustrating the architecture of the radio frame used in the LTE system. As illustrated in FIG. 5, the radio frame includes ten subframes on a time axis. Each subframe includes two slots on the time axis. A length of each subframe is 1 ms, and a length of each slot is 0.5 ms. Each subframe includes a plurality of resource blocks (RB) on a frequency axis and includes a plurality of symbols on a time axis. Each resource block includes a plurality of subcarriers on the frequency axis. Specifically, one RB is constituted by twelve subcarriers and one slot. One symbol and one subcarrier constitute one resource element (RE). In addition, among the radio resources (time and frequency resources) allocated to the UE 100, the frequency resource can be specified by the resource block and the time resource can be specified by the subframe (or slot).

In the downlink, a section of several symbols in the head of each subframe is a region that is mainly used as a physical downlink control channel (PDCCH) for transmitting downlink control information. In addition, the remaining portion of each subframe is a region that is mainly used as a physical downlink shared channel (PDSCH) for transmitting downlink data.

Basically, the eNB 200 transmits downlink control information (DCI) to the UE 100 by using the PDCCH and transmits downlink data to the UE 100 by using the PDSCH. The DCI carried by the PDCCH includes uplink scheduling information, downlink scheduling information, and a TPC command. The uplink scheduling information is scheduling information (UL grant) about allocation of uplink radio resources, and the downlink scheduling information is scheduling information related to allocation of downlink radio resources. The TPC command is information instructing increase or decrease of uplink transmission power. The eNB 200 includes a CRC bit scrambled with an identifier (RNTI: radio network temporary ID) of the destination UE 100 in the DCI so as to identify the UE 100 that is the transmission destination of the DCI. Each UE 100 performs blind decoding on the PDCCH by performing CRC check after descrambling with the RNTI of the UE in the DCI that may be addressed to the UE, and detects the DCI addressed to the UE. The PDSCH carries downlink data by the downlink radio resource (resource block) indicated by the downlink scheduling information.

In the uplink, both end portions in the frequency direction in each subframe is a region that is mainly used as a physical uplink control channel (PUCCH) for transmitting uplink control information. The remaining portion of each subframe is a region that is mainly used as a physical uplink shared channel (PUSCH) for transmitting uplink data.

Basically, the UE 100 transmits uplink control information (UCI) to the eNB 200 by using the PUCCH and transmits uplink data to the eNB 200 by using the PUSCH. The UCI carried by the PUCCH includes a channel quality indicator (CQI), a precoding matrix indicator (PMI), a rank indicator (RI), a scheduling request (SR), and HARQ ACK/NACK. The CQI is an index indicating downlink channel quality and is used for determining the MCS to be used for downlink transmission or the like. The PMI is an index indicating a precoder matrix that is preferably used for downlink transmission. The RI is an index indicating the number of layers (number of streams) that can be used for downlink transmission. The SR is information requesting allocation of PUSCH resources. The HARQ ACK/NACK is delivery confirmation information indicating whether the downlink data has been correctly received.

(Specific State)

Hereinafter, a specific state according to an embodiment will be described. The specific state is a state in which the signaling for the UE 100 is suppressed while an S1 connection for the UE 100 is maintained. The S1 connection may be referred to as an S1 bearer. The S1 connection is a connection established between the eNB 200 and the EPC 20 on the S1 interface. The S1 interface includes an S1-U interface for a user plane and an S1-MME interface for a control plane. The S1 connection includes an S1-U connection established between the eNB 200 and the S-GW 300U on the S1-U interface, an S1-MME connection established between the eNB 200 and the MME 300C on the S1-C interface.

The specific state may be one state of an RRC connected mode or one state of an RRC idle mode. Alternatively, the specific state may be an RRC state different from the RRC connected mode and the RRC idle mode. In an operation pattern 1 according to an embodiment, the specific state is one state (substate) of the RRC connected mode. On the other hand, in an operation pattern 2 according to an embodiment, the specific state is one state (substate) of the RRC idle mode. According to the specific state, signaling is reduced as compared with a general RRC connected mode. In addition, according to the specific state, the UE 100 can start data communication quickly, as compared with a general RRC idle mode. Hereinafter, the specific state is referred to as "light connected state (light connected substate)".

FIG. 6 is a diagram illustrating an overview of an operation related to a transition to a light connected state (specific state). In an initial state of FIG. 6, the UE 100 is in an RRC connected mode, and an RRC connection is established between the UE 100 and the eNB 200. In addition, an S1-MME connection is established between the eNB 200 and the MME 300C. An S1-U connection is established between the eNB 200 and the S-GW 300U. The UE 100 performs data communication with the eNB 200.

As illustrated in FIG. 6, in step S1, the eNB 200 transmits, to the UE 100, a transition instruction (Request to Light Conn.) instructing a transition to the light connected state.

In step S2, the UE 100 transmits an acknowledgment (Ack) message to the eNB 200 in response to reception of the transition instruction. However, step S2 is not essential and can be omitted.

In step S3, the UE 100 and the eNB 200 maintain or release the RRC connection. Specifically, in the operation pattern 1 according to the embodiment, the UE 100 and the eNB 200 maintain the RRC connection. On the other hand, in the operation pattern 2 according to the embodiment, the UE 100 and the eNB 200 release the RRC connection.

In step S4, the eNB 200 and the MME 300C maintain the S1-MME connection. In step S5, the eNB 200 and the S-GW 300U maintain the S1-U connection. In step S6, the UE 100 transitions to the light connected state and suspends data communication with the eNB 200.

The eNB 200 maintains context information (UE context) of the UE 100 that has transitioned to the light connected state, without discarding the context information. The UE context includes information related to various configurations and capabilities for the UE 100. The various configurations include a configuration of access stratum (AS).

The UE 100 in the light connected state can resume data communication with the eNB 200 with less signaling by using the maintained S1 connection and UE context.

The UE 100 that has transitioned to the light connected state in the cell of the first eNB 200 may move from the cell of the first eNB 200 to the cell of the second eNB 200. If the UE 100 resumes data communication in the cell of the second eNB 200, the second eNB 200 acquires the UE context of the UE 100 on the X2 interface from the first eNB 200 and uses the acquired UE context for data communication with the UE 100.

In an embodiment, RAN-based paging is applied to the UE 100 in the light connected state. RAN-based paging performs paging in units of predetermined paging areas in which paging is controlled by the E-UTRAN 10 (eNB 200). The predetermined paging area is an area narrower than the tracking area. By introducing a predetermined paging area, it is possible to reduce the number of cells that perform paging on one UE 100, thereby reducing signaling. Hereinafter, such a predetermined paging area will be referred to as an "RAN paging area".

As an example, the RAN paging area is constituted by the cell of the specific eNB 200 maintaining the S1 connection of the UE 100 in the light connected state and the cell of the eNB 200 around the specific eNB 200. The neighbor eNB 200 may be an eNB 200 having an X2 interface with the specific eNB 200. If the NAS signaling or data addressed to the UE 100 in the light connected state is received from the MME/S-GW 300, the specific eNB 200 determines that RAN-based paging is to be performed, and the UE 100 performs paging together with the neighbor eNB 200. The paging may be performed by transmitting an RRC paging message, or may be performed by transmitting data addressed to the UE 100 as a paging message.

(Operation Pattern 1)

Hereinafter, an operation pattern 1 according to an embodiment will be described.

In the operation pattern 1, the UE 100 in the RRC connected mode receives, from the eNB 200, a message instructing the configuration change of the RRC connection, and changes the configuration according to the reception of the message. As an example, the message is an RRC connection reconfiguration message. As another example, the message is a message different from the RRC connection reconfiguration message. In the operation pattern 1, a case in which the message is the RRC connection reconfiguration message is assumed. The eNB 200 changes the RRC configuration of the UE 100 by transmitting the RRC connection reconfiguration message to the UE 100.

The eNB 200 transitions the UE 100 to the light connected state by including information instructing the transition to the light connected state in the RRC connection reconfiguration message. The UE 100 transitions to the light connected state in response to the fact that the information instructing the transition to the light connected state is included in the RRC connection reconfiguration message. In the operation pattern 1, the light connected state is a state in which at least one function for generating signaling with the eNB 200 among a plurality of functions of the UE 100 is deactivated while maintaining the RRC connection.

Here, the plurality of functions (features) may include a data (user data) transceiving function, a scheduling request (SR) transmitting function, a channel state information (CSI) transmitting (that is, CSI feedback) function, a sounding reference signal (SRS) transmitting function, a carrier aggregation function, a dual connectivity function, a semi-persistent scheduling (SPS) function, a WLAN aggregation function, a radio link monitoring (RLM) function, a notification (in-device coexistence indication UE assistance information, MBMS interest indicator, sidelink UE information, etc) function, an idle mode discontinuous reception (DRX) function, and a WLAN interwork function using broadcast signaling. However, in the light connected state, at least one of the cell reselection function, a connected mode DRX function, and the WLAN interworking function using dedicated signaling may be maintained in an activated state without being deactivated. For details of these functions, see, for example, 3GPP technical specification "TS 36.300 V 13.4.0".

Figure 7:
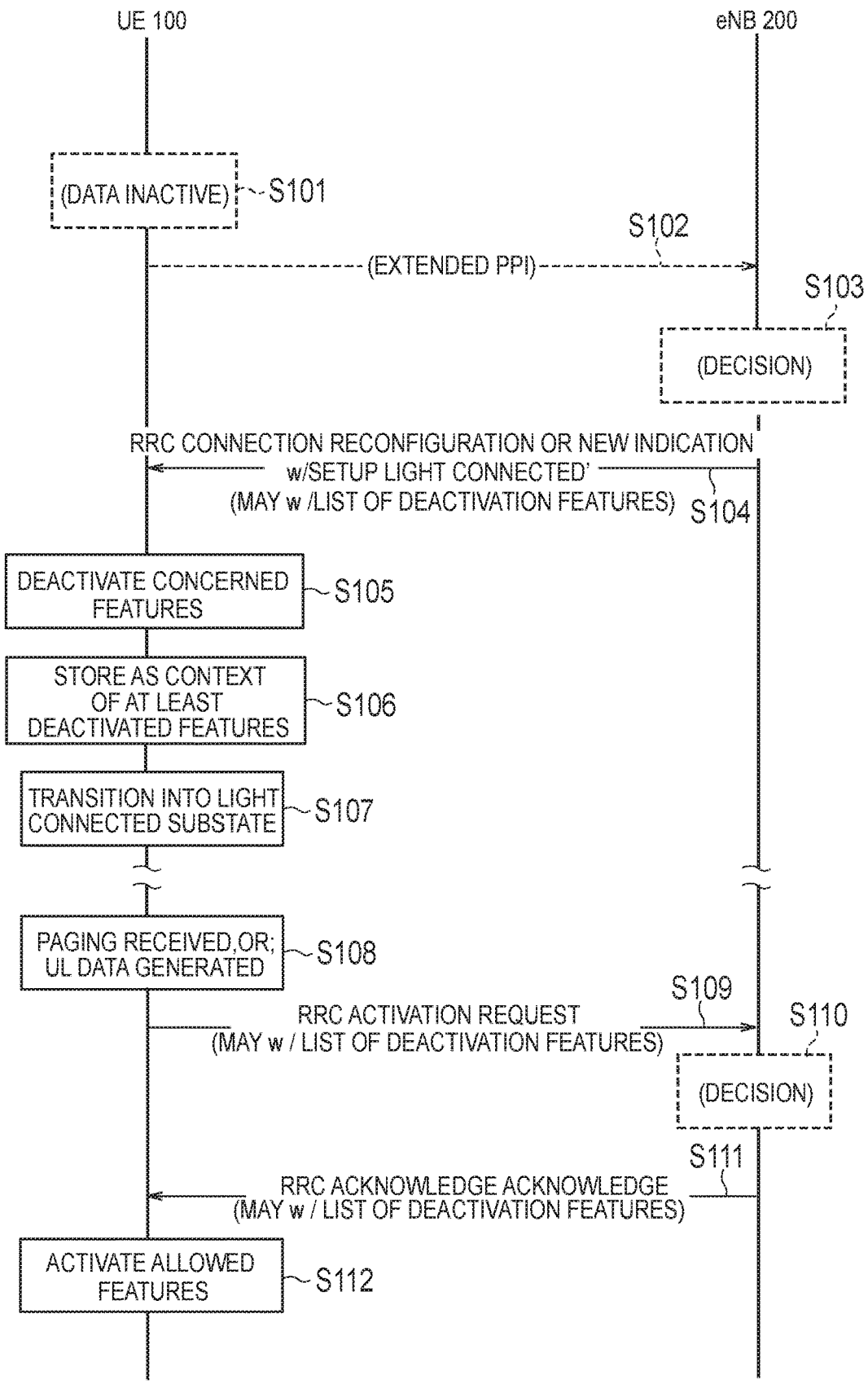
FIG. 7 is a diagram illustrating an operation pattern 1 according to an embodiment.

FIG. 7 is a diagram illustrating the operation pattern 1 according to the embodiment. In the initial state of FIG. 7, the UE 100 is in the RRC connected mode and performs data communication with the eNB 200. It should be noted that the process indicated by the dashed line in FIG. 7 is not essential and can be omitted.

As illustrated in FIG. 7, in step S101, the UE 100 detects interruption of data communication with the eNB 200.

The interruption of the data communication may include a case in which downlink (DL) data is not received (or it is unlikely to receive downlink (DL) data) and/or a case in which uplink (UL) data is not transmitted (or it is unlikely to transmit uplink (UL) data). Here, the likelihood may be a state in which it is predicted that data will not be generated in a certain period. The predetermined period may be configured from the eNB 200. The configuration from the eNB 200 to the UE 100 is performed by RRC signaling. The RRC signaling may be a UE-dedicated signaling (for example, an RRC connection reconfiguration message) or a broadcast signaling (for example, a system information block (SIB)).

As an example, the RRC layer of the UE 100 detects interruption of data communication with the eNB 200 based on information of a layer (for example, application layer) higher than the RRC layer. As an example, the RRC layer of the UE 100 may detect interruption of data communication in response to shutdown of an application with the highest communication frequency at the present time. As another example, the RRC layer of the UE 100 may detect interruption of data communication in response to the fact that the operation system (OS) makes communication restrictions, the fact that there are no applications running in the foreground (that is, there is only the background process), and the fact that the OS determines that the data communication is interrupted.

In step S102, the UE 100 transmits, to the eNB 200, a notification indicating that the data communication is interrupted. The UE 100 may transmit the notification by signaling of the RRC layer. The signaling of the RRC layer may be a UE assistance information message or another message. If the notification indicating the interruption of the data communication is transmitted in the UE assistance information message, the notification may be referred to as an extended power preference indicator (extended PPI).

In step S103, the eNB 200 determines to make the UE 100 transition to the light connected state in response to reception of the notification indicating the interruption of the data communication.

In step S104, the eNB 200 transmits, to the UE 100, an RRC connection reconfiguration message (or another message) including information instructing a transition to the light connected state. In other words, the eNB 200 transmits the instruction of the transition to the light connected state as the configuration change of the RRC connection.

The information instructing the transition to the light connected state is, for example, "Light Connected=Setup". In addition, the RRC connection reconfiguration message may include information designating a deactivation function among the plurality of functions described above. As an example, the eNB 200 includes a list of activation maintenance functions or a list of deactivation functions in the RRC connection reconfiguration message in order to individually designate functions to be deactivated.

In step S105, the UE 100 deactivates a predetermined function among the plurality of functions (features) described above in response to the reception of the RRC connection reconfiguration message including the information instructing the transition to the light connected state. If the deactivated function is designated by the RRC connection reconfiguration message, the UE 100 deactivates only the designated function.

In step S106, the UE 100 holds the configuration information (AS context) of the predetermined function even if the predetermined function is deactivated. In other words, even if transitioning to the light connected state, the UE 100 maintains the configuration information of the deactivated function without discarding the deactivating function.

In step S107, the UE 100 transitions to the light connected state. In the operation pattern 1, the light connected state is one state (substate) of the RRC connected mode. The UE 100 in the light connected state performs a process for receiving a paging message transmitted within an RAN paging area.

After that, in step S108, the UE 100 in the light connected state detects a predetermined event in the UE 100. The predetermined event is either the reception of the paging message from the eNB 200 or the occurrence of the UL data to be transmitted to the eNB 200. The predetermined event may be that the UL data is generated and the amount of the UL data is equal to or greater than a threshold value. The threshold value may be configured to the UE 100 from the eNB 200.

In step S109, the UE 100 in the light connected state transmits, to the eNB 200, an activation request (RRC activation request) requesting the activation of the deactivated function in response to the detection of the predetermined event.

The activation request may require the activation of all the deactivated functions or may require the activation of some deactivated functions. In the case of requesting the activation of all the deactivated functions, the activation request may be a stop request of the light connected state (that is, a transition request to a normal RRC connected mode). On the other hand, in the case of requesting the activation of all the deactivated functions, the activation request may include a list of functions to be activated, or may include a list of functions to maintain a deactivated state.

In step S110, in response to the reception of the activation request, the eNB 200 determines whether the request is acceptable. Here, the description will be given on the assumption that the eNB 200 determines that the request is acceptable. It should be noted that if the eNB 200 determines that the request is not acceptable, the eNB 200 may transmit a non-acknowledgment (Nack) or a rejection notification (Reject) to the UE 100.

In step S111, the eNB 200 transmits, to the UE 100, an acknowledgment (RRC activation acknowledge) to the activation request. It should be noted that the eNB 200 may determine whether to accept the activation request for each function. In this case, the eNB 200 may include, in the RRC activation acknowledge, a list of functions that permit activation and/or a list of functions that reject activation. Alternatively, instead of the acknowledgment, an RRC connection reconfiguration message may be used.

In step S112, the UE 100 determines whether to activate the deactivated function based on the contents of the response received from the eNB 200. If the acknowledgment is received, the UE 100 activates the permitted function. The UE 100 activates the function from the time point (subframe) when the acknowledgment is received. Alternatively, the UE 100 may activate the function within a certain period (for example, within eight subframes) after the acknowledgment is received.

(Operation Pattern 2)

In the operation pattern 2 according to the embodiment, a difference from the operation pattern 1 will be mainly described below.

In the operation pattern 2, the UE 100 in the RRC connected mode receives, from the eNB 200, an RRC connection release message instructing the release of the RRC connection, and releases the RRC connection in response to the reception of the RRC connection release message. The RRC connection release message includes a field (release cause) indicating the cause of releasing the RRC connection. The UE 100 transitions to the light connected state in response to the fact that the field includes information (for example, RRC-LightConnected) instructing the transition to the light connected state is included in the field. The eNB 200 transitions the UE 100 to the light connected state by including the information instructing the transition to the light connected state in the field.

In the operation pattern 2, the light connected state is a state in which the RRC connection is released and the S1 connection for the UE 100 is maintained between the eNB 200 and the core network (EPC 20). In the operation pattern 2, the light connected state may be further a state in which at least a part of the plurality of functions described above is deactivated.

Figure 8:
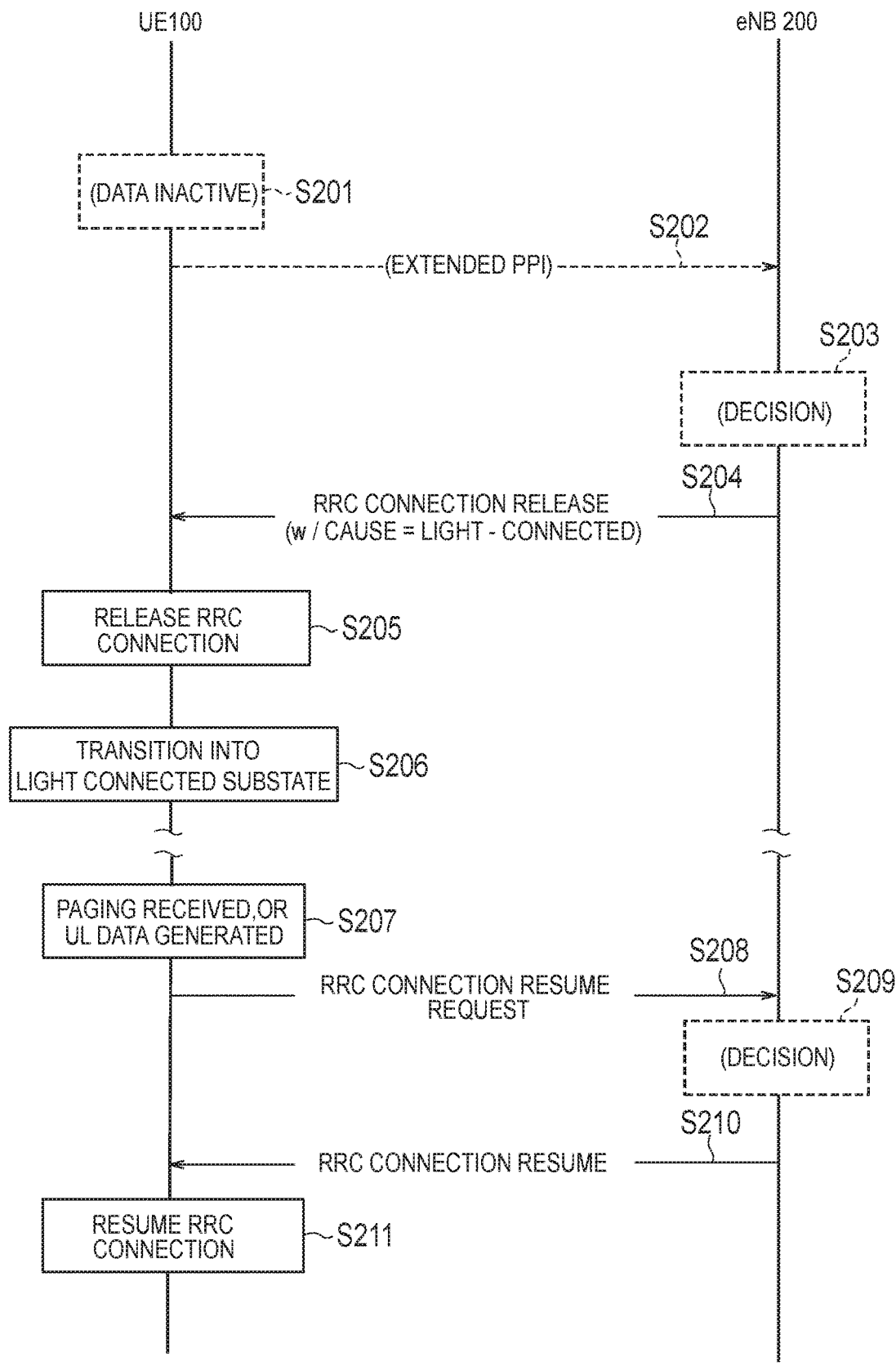
FIG. 8 is a diagram illustrating an operation pattern 2 according to an embodiment.

FIG. 8 is a diagram illustrating the operation pattern 2 according to the embodiment. In the following, a difference from the operation pattern 1 illustrated in FIG. 7 will be mainly described and a redundant description thereof will be omitted.

As illustrated in FIG. 8, steps S201 to S203 are similar to the operation pattern 1.

In step S204, the eNB 200 transmits, to the UE 100, an RRC connection release message including information instructing a transition to a light connected state as a release cause. The RRC connection release message may include information designating a deactivating function among the plurality of functions described above. In this case, the handling of the deactivating function is the same as the operation pattern 1. The RRC connection release message may include a resume identifier (resume ID). The eNB 200 holds the UE context in association with the resume identifier.

In step S205, the UE 100 releases the RRC connection with the eNB 200 in response to the reception of the RRC connection release message including the information instructing the transition to the light connected state as the release cause.

In step S206, the UE 100 transitions to the light connected state. In the operation pattern 2, the light connected state is one state (substate) of the RRC idle mode. The UE 100 in the light connected state performs a process for receiving a paging message transmitted within an RAN paging area.

After that, in step S207, the UE 100 in the light connected state detects a predetermined event in the UE 100.

In step S208, the UE 100 in the light connected state transmits, to the eNB 200, an RRC connection resume request requesting the resume of the RRC connection in response to the detection of the predetermined event. The RRC connection resume request may include information requesting the activation of the deactivated function. The RRC connection resume request may include a resume identifier.

In step S209, in response to the reception of the RRC connection resume request, the eNB 200 determines whether the request is acceptable. Here, the description will be given on the assumption that the eNB 200 determines that the request is acceptable.

In step S210, the eNB 200 transmits an RRC connection resume message to the UE 100. The eNB 200 may include, in the RRC connection resume message, a list of functions that permit activation and/or functions that reject activation.

In step S211, the UE 100 resumes the RRC connection based on the RRC connection resume message received from the eNB 200. The eNB 200 resumes the use of the UE context based on the resume identifier.

(Mobility Status Information)

In the operation patterns 1 and 2, the notification indicating interruption of data communication may include mobility status information related to the moving speed of the UE 100. The eNB 200 receives the mobility status information related to the moving speed of the UE 100 from the UE 100 and determines the range of the RAN paging area corresponding to the UE 100 based on the mobility status information.

Alternatively, the UE 100 may transmit the mobility status information to the eNB 200 at any of the following timings.

First, the UE 100 transmits the mobility status information with the update of the tracking area or the RAN paging area as a trigger. In this case, the UE 100 may include the mobility status information in a tracking area update message or a RAN paging area update message.

Second, the UE 100 transmits mobility status information with the cell reselection as a trigger. In this case, the UE 100 may include the mobility status information in the cell update message.

Third, the UE 100 transmits the mobility status information with an inquiry from the eNB 200 as a trigger.

Fourth, the UE 100 periodically transmits the mobility status information. The period may be configured from the eNB 200 to the UE 100.

Figure 9:
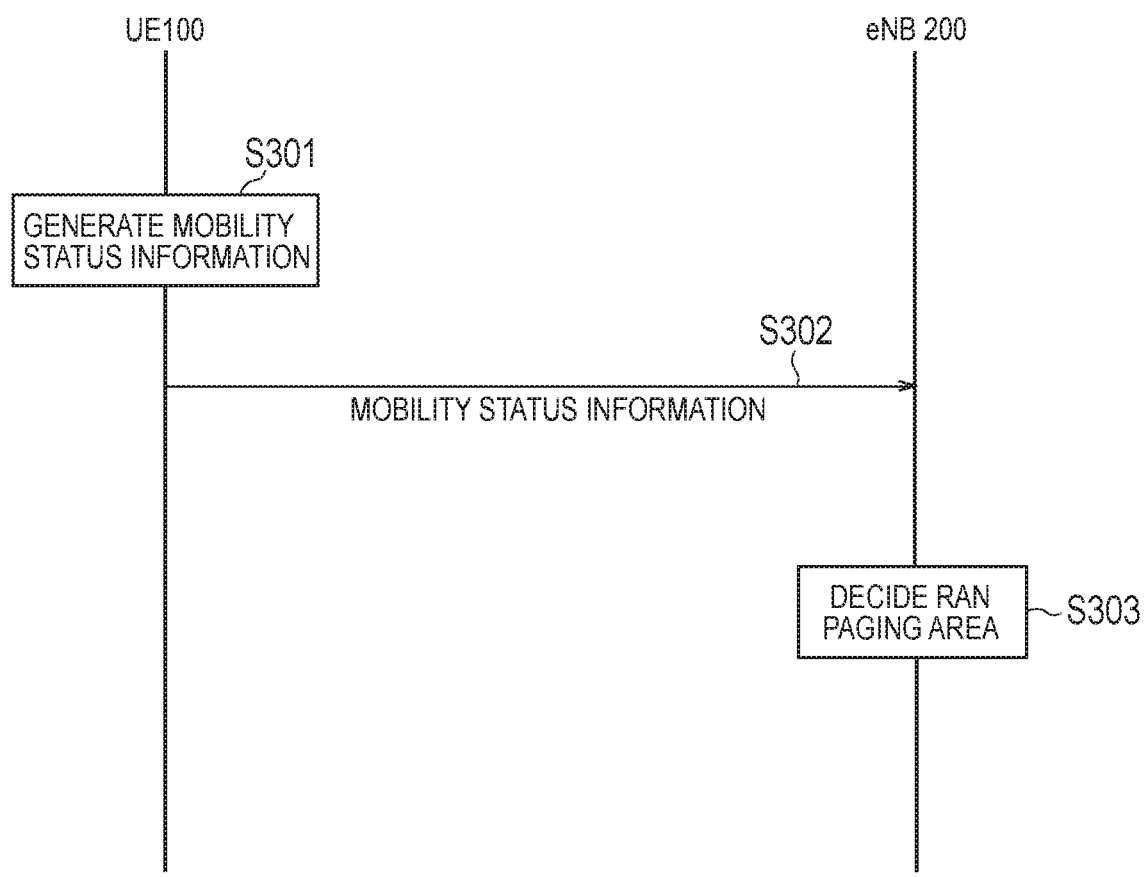
FIG. 9 is a diagram illustrating an operation for determining a RAN paging area according to an embodiment.

FIG. 9 is a diagram illustrating the operation for determining the RAN paging area.

As illustrated in FIG. 9, in step S301, the UE 100 generates mobility status information. The mobility status information includes at least one piece of the following information.

1) Number of times of handovers or number of times of cell reselections within predetermined time. The predetermined time may be configured from the eNB 200 to the UE 100.

2) Average moving speed within predetermined time. The moving speed can be obtained from position information of the UE 100. The moving speed is not limited to a value of a direct moving speed (for example, xxx km/h) and may be an index of a moving speed (for example, high/mid/low). The predetermined time may be configured from the eNB 200 to the UE 100.

3) 1-bit identifier indicating whether moving speed exceeds threshold value. Here, the above 1) or 2) can be used as the moving speed. The threshold value may be configured from the eNB 200 to the UE 100.

4) Cell history information of UE 100. The cell history information includes a plurality of combinations of the ID of the cell and the staying time in the cell.

In step S302, the UE 100 transmits, to the eNB 200, a message including the mobility status information. The UE 100 may further include its own position information in the message. The UE 100 may further include its own category (UE category) in the message.

In step S303, the eNB 200 decides the range of the RAN paging area based on the mobility status information. The eNB 200 may notify the MME 300C of the list of cells (and eNBs) belonging to the determined RAN paging area.

As an example, the eNB 200 configures a wider RAN paging area to the UE 100 having a high moving speed so as to prevent missed paging. On the other hand, a narrower RAN paging area is configured to the UE 100 with a slow moving speed so as to reduce the number of signalings by the paging message.

As another example, the eNB 200 configures a wider RAN paging area to the UE 100 of a category M1 so as to reduce power consumption. The category M1 is a UE category for machine type communication and requires a power saving operation. This makes it possible to reduce the RAN paging area update message required when leaving the RAN paging area.

(Other Embodiments)

In each of the above-described embodiments, the example in which the light connected state is terminated with the occurrence of the predetermined event as a trigger has been described. The light connected state may be valid only during a period in which the timer configured from the eNB 200 to the UE 100 is in operation. In this case, the predetermined event may be the expiration of the timer. Alternatively, the light connected state may be valid only during a period in which the UE 100 exists within a predetermined frequency. For example, the UE 100 having received the instruction of the light connected state in a certain cell may terminate the light connected state in response to the movement to a cell having a frequency different from the frequency to which the cell belongs.

In the embodiment described above, the LTE system has been exemplified as the mobile communication system. However, the present disclosure is not limited to the LTE system. The present disclosure may be applied to systems other than the LTE system.

[Supplementary Note 1]

(1. Introduction)

In this supplementary note, the general issues for the UE behaviour in Light Connected are discussed.

(2. Discussion)

S1 connection of a UE lightly connected is kept and active, in order to hide the mobility and state transitions from CN. It could be interpreted that the UE in Light Connected is still in either ECM-Connected state or a quite similar "substate" from the core network point of view, and it's somewhat related to UE's "substate". However, it's still FFS and may be related to the progresses in the other topic, i.e., RAN-initiated paging, and in the other WG(s).

Observation 1: The UE in Light Connected is in the same or similar "substate" to ECM-Connected from the core network point of view.

Apart from the ECM states, the objective of WID states "Necessity of a new RAN based state" and "the solution can consider reusing the Suspend/Resume procedure". So, it's one of important aspects how to model the light connection from the perspective of RRC, e.g., reusing the RRC Suspend/Resume concept or introducing a new RRC state, and it's RAN2's responsibility. Such a modelling is eventually related to the other topics, but the general framework could be discussed at this point. So, RAN2 should start the discussion from the outline of Light Connected.

Proposal 1: RAN2 should start the discussion on the modelling of Light Connected from RRC point of view.

(2.1. Observations from RAN Controlled "State" for NR)

In the NR session of RAN2 #94, the topic on RRC state was discussed and the agreements were reached as follows;

Agreements: (for NR)
1. Study the introduction of a RAN controlled "state" characterised by, at least:

a/—UEs in RAN controlled state should incur minimum signalling, minimise power consumption, minimise resource costs in the RAN/CN making it possible to maximise the number of UEs utilising (and benefiting from) this state b/ Able to start data transfer with low delay (as required by RAN requirements)

FFS whether data transfer is by leaving the "state" or data transfer can occur within the "state".

FFS whether "state" translates to an RRC state.

Potential characteristics of the RAN controlled "state" for study:

a/ the CN/RAN connection is maintained.
b/ AS context stored in RAN.
c/ Network knows the UE's location within an area and UE performs mobility within that area without notifying the network.
d/ RAN can trigger paging of UEs which are in the RAN controlled "inactive state".
e/ No dedicated resources It could be interpreted that the RAN controlled "state" is somewhat between RRC Connected and RRC IDLE in LTE. Just for study, the potential characteristics were identified in the agreements and observed with some of commonalities to what already agreed/intended for Light Connection;

"a/ the CN/RAN connection is maintained" may be the same with the agreement that "S1 connection of a UE lightly connected is kept and active, in order to hide the mobility and state transitions from CN".

"b/ AS context stored in RAN" can be achieved today, i.e., by RRC Connected state or RRC Suspended "substate" specified in Rel-13.

"c/ Network knows the UE's location within an area and UE performs mobility within that area without notifying the network" is as it is today, i.e., Tracking Area (MME-controlled), or has much commonality with the proposals for the paging enhancements, i.e., the paging area concept (RAN-controlled).

"d/ RAN can trigger paging of UEs which are in the RAN controlled "inactive state"" seems to be a common view that "For the UE lightly connected, the RAN initiated paging is feasible and beneficial in terms of signalling reduction as well as decreasing latency from RAN2 perspective".

"e/ No dedicated resources" has not been discussed in this WI so far.

As the concept level, it seems useful to learn from the findings of NR's discussion on the RAN controlled "state", since the issue to be solved is almost the same, i.e., optimizations for UEs with "data inactive". So, these are a good starting point for the discussion of Light Connected modelling.

Observation 2: The RAN controlled "state" intended for NR seems to have commonalities with Light Connected.

For summary of the potential characteristics, a/ is already agreed for Light Connected. Also, c/ and d/ are tightly related to the discussion of paging enhancements, e.g., RAN-initiated paging, and discussed in another contribution. So, the characteristics of b/ and e/ are focused in the following sections.

Also, the FFSs in NR will be also the same for Light Connection, i.e., "FFS whether data transfer is by leaving the "state" or data transfer can occur within the "state"" and "FFS whether "state" translates to an RRC state".

(2.2. Framework of Light Connected)
(2.2.1. RRC States and "Substate")

LTE has a couple of RRC states, i.e., RRC Connected and RRC IDLE. Even when RRC Connection Suspend/Resume procedure was introduced in Rel-13, it kept the two states modelling. The UE with suspending RRC connection is just in RRC IDLE from the state point of view, i.e., a "substate" of IDLE UEs with storing the AS context and the resume ID.

The two states modelling works well to simplify the state transitions and these conditions, which were a bit complex in the legacy system. So, RAN2 should stick to the RRC modelling even if Light Connected is introduced, i.e., to be defined as Light Connected "substate" which is a part of RRC Connected or IDLE whereby certain features are added or restricted depending on the desired operations to be decided by RAN2.

Proposal 2: RAN2 should stick to the existing two states modelling, i.e., RRC Connected and IDLE, when Light Connected is defined in RRC.

(2.2.2. Baseline States)

If Proposal 2 is agreeable, Light Connected "substate" is built on top of either RRC Connected or RRC IDLE.

As observed in section 2.2.2, "b/ AS context stored in RAN" for the RAN controlled "state" of NR can be a good guideline for Light Connected "substate" and available in RRC Connected state or RRC Suspended "substate" specified in Rel-13. Assuming it's aimed to a "substate" between RRC Connected and RRC Suspended, Light Connected should support the AS context storage or rather availability.

Proposal 3: The AS context should be available during Light Connected.

As mentioned in section 2.1, it has not been discussed whether the potential characteristic of "e/ No dedicated resources" is applicable to Light Connected. Although the terminology "dedicated resource" is unclear, if it implies no C-RNTI is allocated to the UE then it's suitable to define Light Connected on top of RRC IDLE state, i.e., another "substate" of RRC IDLE; but not the same as RRC Suspended. Otherwise (e.g., just meaning no PUCCH resource is allocated), it could be possible to take RRC Connected state as the basis. It was suggested that RRC Suspended/Resume should be the baseline of Light Connected. It's indeed a nice way from RAN2 standardization efforts point of view, that Light Connected is a combination of suspending RRC connection from UE's perspective and the new feature to keep S1 connections in active from CN's perspective. Even though it's still beneficial for S1, i.e., eliminating the UE Context Suspend/Resume Request/Response, it should be noted that compared to Rel-13 there will be no gain in Rel-14 in terms of reductions of signalling and latency in Uu, since it relies on Rel-13 procedure.

Observation 3: RRC Suspend-based Light Connection may be possible without any gain in Uu.

On the other hand, RRC Connected-based approach is also proposed. Needless to say, the most significant benefit of RRC Connected is low access latency in MO and MT calls. Additionally, no paging is necessary for MT call. So, RRC Connected-based Light Connection has the potential to improve the signalling and latency in Uu. However, it's obviously worse for the UE power consumption just to keep the UEs in legacy RRC Connected, i.e., it cannot achieve the objective that "The solution shall enable the UE power consumption to be comparable to that one in RRC_IDLE". Therefore, some optimizations would be necessary, if RRC Connected-based Light Connection is the way.

Observation 4: RRC Connected-based Light Connection may have the potential to improve the signalling overhead and the access latency in Uu, although the standardization efforts will be necessary in RAN2 to minimize the UE power consumption.

Taking into account the first statement of WI objectives that "The objective of this work item is to reduce the radio and network interfaces signalling overhead, and improve the UE access latency as well as UE power consumption for all device types", RAN2 should discuss which RRC state should be baseline for Light Connected, IDLE (including suspend/resume) or Connected.

Proposal 4: RAN2 should discuss which RRC state should be baseline for Light Connected, IDLE (including suspend/resume) or Connected.

(2.3. General Features)

Regardless of baseline RRC state, it would be useful to discuss which feature is necessary for the UE in Light Connected.

(2.3.1. Data Transmission and Reception Aspects (DL/UL/SL))

If the Light Connection is introduced, it needs to be clarified whether the Light connected UE is required to perform data transmission and reception, i.e., downlink (DL), uplink (UL) and sidelink (SL). In the existing IDLE mode, only SL is allowed with "softly" controlled by the eNB, i.e., Type 1 or Mode 2 transmission within the configuration provided in SIB18/19, while DL and UL needs the control signalling in advance, e.g., Paging, RACH and/or RRC Connection Request. In Connected mode, DL and UL are "tightly" controlled by the eNB, i.e., DL assignment and UL grant, while SL may require tight control, i.e., Type 2B or Mode 1 transmission by dedicated resource or SL grant, depending on the eNB's preference.

The eMBMS services, i.e., MBSFN and SC-PTM, may be provided for both UEs in IDLE and Connected, if the UE has its interest. If the Light Connection is somewhat an inter-level between the RRC states, it may be natural to allow the UEs to receive these services.

Proposal 5: RAN2 should discuss on what the UE behaviour is for data transmission/reception over Downlink, Uplink and Sidelink in Light Connection.

(2.3.2. Measurements and Reporting Aspects (CSI/RLM/RRM))

UEs in Connected perform the various types of measurements, i.e., CSI measurement, RLM measurement and RRM measurement, as well as measurement feedback/reporting. On the other hand, UEs in IDLE only perform RRM measurement for cell reselection without reporting, i.e., UE-based mobility. With Light Connection, it is necessity to discuss which of these measurements and feedback/reporting needs to be supported, which should depend on whether Light Connection is more like CONNECTED or IDLE.

Proposal 6: RAN2 should discuss which measurement and reporting mechanisms, CSI feedback, RLM/RRM measurements, needs to be supported for Light Connection.

(2.3.3. Activation and Deactivation Aspects (SCell, SPS))

The SCell(s) could be configured for Carrier Aggregation and Dual Connectivity, and these are activated or deactivated by e.g., the MAC Control Element. Also, SPS is configured for efficient delivery of e.g., VoLTE, and it's activated by PDCCH scrambled with SPS-RNTI. In the current specification, SCell(s)/SPS are de-configured when the UE transitions to IDLE, and it's reconfigured as needed when/after the UE transitions back to Connected. With Light Connection, it's also necessary to define whether SCell(s) and SPS are deactivated or even de-configured.

Proposal 7: RAN2 should discuss whether SCell(s) and SPS is deactivated or de-configured, when the UE transitions from CONN to Light Connection.

(2.3.4. Assistance Information from UE Aspects)

The current RRC supports many indications from the UE to assist with the eNB's functional control of various mechanisms, i.e., Proximity Indication, In-device Coexistence Indication, UE Assistance Information (Power Preference Indication), MBMS Interest Indication, MBMS Counting Response and Sidelink UE Information. In PHY layer, the sounding reference signal, SRS, is also used e.g., to estimate UL channel. In Light Connection, it is necessary to discuss if any of the indications should still be supported by the UE.

Proposal 8: RAN2 should discuss whether the UE in Light Connection continues the eNB assistance with Proximity Indication, In-device Coexistence Indication, UE Assistance Information, MBMS Interest Indication, MBMS Counting Response, Sidelink UE Information, and SRS.

(2.4. Other Features)

(2.4.1. Dual Connectivity)

In addition to SCell(s) discussed in section 2.3.3, it may be defined whether PSCell should be de-configured when the UE moves into Light Connection. If the PSCell is still applicable in Light Connection, it should also be discussed whether SCG Failure Indication needs to be declared.

Proposal 9: RAN2 should discuss whether PSCell is de-configured, when the UE moves into Light Connection.

(2.4.2. WLAN Interworking/Aggregation (RALWI, RCLWI, LWA, LWIP))

In Rel-12 and Rel-13, a couple of mechanisms for WLAN Interworking were developed, i.e. RAN-assisted and RAN-controlled LTE-WLAN Interworking solutions, RALWI/RCLWI. The LWI mechanisms allow the NW to control UE in Connected its traffic steering to/from WLAN by the dedicated RAN assistance parameter or the steering command. After the UE transitions to IDLE, the configuration, which was set when the UE was in Connected, is still applicable during T350 is running. In addition for RALWI, SIB17 may provide the RAN assistance parameters and controls the UE in IDLE as well as in Connected. It should be further discussed how the UE performs RALWI/RCLWI under Light Connection.

Proposal 10: RAN2 should discuss how the UE performs RALWI/RCLWI during Light Connection.

In Rel-13, a set of WLAN aggregation solutions were specified, i.e., LTE-WLAN Aggregation (LWA) and one using IPsec tunnel (LWIP). The LWA bearer is routed over WLAN link and terminated at the eNB and the UE. Considering the Light Connection over Uu, it also needs to be clarified how the LWA configuration and LWA bearer(s) are handled when the UE is in Light Connection.

Proposal 11: RAN2 should discuss how the LWA bearer(s) is handled in Light Connection.

(2.4.3. MDT)

The minimization of drive test, MDT, was introduced in Rel-10 and continuously enhanced onward. The MDT consists of two modes, i.e., Logged MDT for IDLE/Connected modes and Immediate MDT for Connected mode. The MDT measurement log is sent over the measurement reporting when the UE is in Connected, wherein the logging continued even if the UE is in IDLE, in case of Logged MDT. For Light Connection, it has to be discussed which MDT mode is supported.

Proposal 12: RAN2 should discuss which MDT mode is supported for UEs in Light Connection.

(2.4.4. MCLD)

The multi-carrier load distribution, MCLD, supports the two redistribution mechanisms, the continuous redistribution scheme (CRS) and the one-shot scheme (OSS). These mechanisms is provided the redistribution parameter in SIB3/SIB5, and the UE in IDLE selects the redistribution target according to its IMSI upon either T360 expiry (CRS) or reception of the redistribution indication within the paging (OSS). For Light Connection, the load redistribution mechanisms may be applicable since current assumption is that the UE should perform UE-based mobility.

Proposal 13: RAN2 should discuss whether load redistribution is supported in Light Connection.

In addition to above, it may also have to discuss whether any enhancements are needed in the current features due to the introduction of Light Connection, e.g., some special handling such as an implicit deactivation/de-configuration.

Proposal 14: Additionally, RAN2 should also discuss whether any enhancements are necessary for the existing features due to the introduction of Light Connection.

[Supplementary Note 2]

(1. Introduction)

In this supplementary note, the details of paging enhancement alternatives for Light Connected UEs are discussed, although some of the issues may still depend on RAN3's decision.

(2. Discussion)

(2.1. Principle of Paging Enhancements)

(2.1.1. Issues in the Existing Paging Solutions)

Although RAN2 already identified "the RAN initiated paging is feasible and beneficial", it's useful to further discuss whether the solutions identified thus far have sufficient benefits to justify the change or if other alternatives should also be considered based on reasonable design principles.

(2.1.1.1. Paging Optimizations for Stationary or Low Mobility UEs)

Before Rel-13, paging messages were transmitted in all cells within a tracking area, regardless of whether the target UE(s) is actually located in the cell transmitting the message. In Rel-13, the paging optimizations were introduced by RAN3 and SA2 for the signalling reduction on Uu as well as S1, e.g., the Recommended Cells for Paging 1E within S1 PAGING These Rel-13 mechanisms are efficient especially for UEs with low mobility, e.g., MTC UEs, but there may be a room for further optimizations considering UEs with normal mobility, e.g., smartphones. For example, even when the MME determines from/informs the eNB of the recommended eNB/cell within S1 PAGING based on its knowledge of Information On Recommended Cells And ENBs at transition to ECM IDLE, the UE upon this MT call may have already moved outside of the recommended eNB/cell. This would result in missed pages, and the resources used for the pages are wasted.

Observation 1: Paging optimizations introduced in Rel-13, e.g., the Recommended Cells for Paging IE within S1 PAGING, may work effectively only for stationary or low mobility UEs.

Proposal 1: The paging enhancements should support UEs in all types of mobility conditions, not limiting to stationary or low mobility UEs.

(2.1.1.2. Deployments with Smaller Tracking Areas)

The various solutions with RAN-initiated paging mechanism were proposed in RAN2 #94. One of the key benefits among the solutions is to limit the paging area. It indeed contributes to reduce number of paging messages in a whole network, if the RAN-initiated paging area is set to a subset of a tracking area. Similar gain may be achieved with a NW implementation today, e.g., the tracking area is configured with smaller region. But it has been pointed out that such a NW implementation will cause excessive Tracking Area Updates from UEs, whereby the overall signalling will likely increase.

Observation 2: Although the number of paging messages can be reduced if a smaller paging area is configured, excessive Tracking Area Updates may not be preventable.

Proposal 2: The paging enhancements should minimize the number of UL signalling due to UE mobility.

(2.1.2. Building Blocks from Agreement)

RAN2 agreed that "For the UE lightly connected, the RAN initiated paging is feasible and beneficial in terms of signalling reduction as well as decreasing latency from RAN2 perspective". It mentions the RAN-initiated paging helps with the reduction of both signalling and latency in Uu. When "S1 connection of a UE lightly connected is kept and active", the signalling of S1 PAGING is no longer needed and the latency due to S1-U connection establishment can be eliminated. However, from RAN2 perspective, it's still unclear how the RAN-initiated paging is useful for Uu signalling/latency reduction.

Observation 3: It is unclear how the RAN-initiated paging is useful for signaling and latency reduction in the Uu link.

To make up better solution and move the discussion forward, the paging enhancements, e.g., the RAN-initiated paging, should be designed with the principles discussed in this section. So, RAN2 should first agree the design principles for the paging enhancements.

(2.2. Details of Paging Enhancements)

It could be considered some of design alternatives/options for the solution of paging enhancements, as discussed in the following sections.

(2.2.1. Alternative 1: RAN-Controlled DL Transmission)

(2.2.1.1. Paging Message or Direct Data Transfer)

With the RAN-initiated paging, the eNB may notice the necessity of paging upon arrival of DL data for the UE, without relying on S1 PAGING. The working assumption mentions "Light connected UE can be addressed only by the trigger of paging initiated by eNB or MME", which suggests some sort of paging message is sent to the UE but the details are yet to be discussed. From the U-plane's point of view, the difference between legacy paging (MME-initiated) and the new paging (eNB-initiated) is based on whether the DL data is still in the S-GW or has already arrived in the eNB, i.e., the routing in the CN is already done while S1 connection is kept and active. So, it would be worth considering whether the paging message is really necessary in this case, and the following options could be considered when the eNB receives DL data for a Light Connected UE.

Option 1: The eNB sends the (RAN-level) paging message to the UE.

This option is based on the assumptions that upon DL data arrival, the eNB sends a paging message to the UE, and the paging message may be similar to or can even reuse the existing Paging from Uu's point of view. However, it's not crystal clear RAN-level paging is "beneficial in terms of signalling reduction as well as decreasing latency" in Uu.

Option 2: The eNB send the DL data directly to the UE, without any paging message.

With Option 2, paging messages are not needed over the Uu link. For example, if the eNB sends the DL data immediately to the UE without sending a page. Although this may mean the DL data need to be send initially on more than one cell, the DL data volume can be managed efficiently such that the differences in the excess DL data send over multiple cells may be comparable to the amount of data needed for paging messages. The amount of signalling messages may be reduced by sending the DL data over the intended paging occasion(s), to minimize the power consumption of UEs, similar to the existing DRX. The main benefit of this option is the reduction in latency of sending the DL data due to the RTT of the paging procedure, e.g., Paging and RRC Connection Request. The details should be further discussed and may be related to how to Light Connected is defined, including mobility aspects (UE-based or NW-based).

Figure 10:
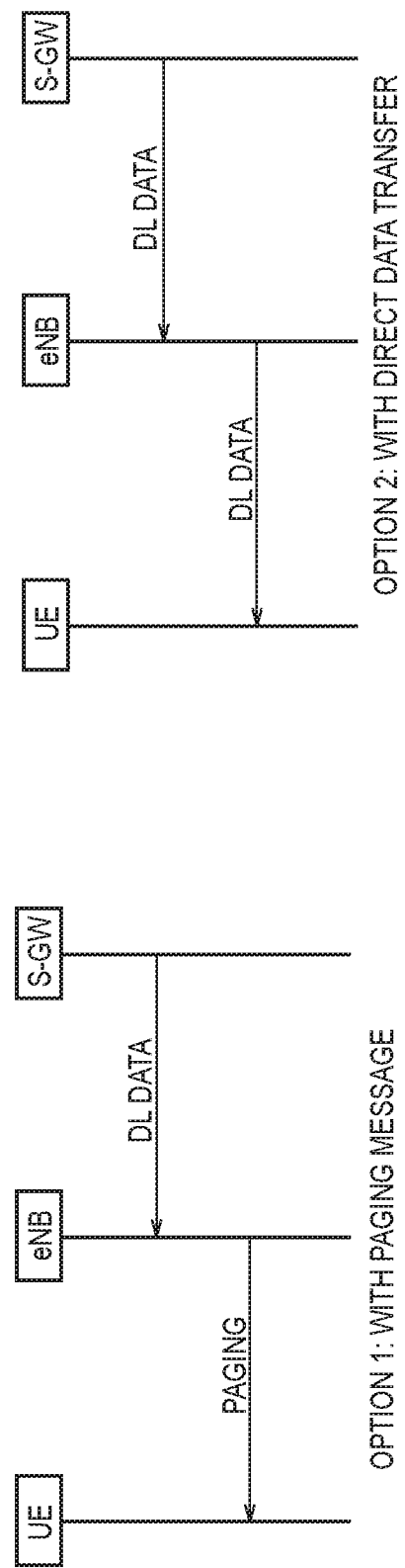
FIG. 10 is a diagram illustrating a DL transmission option of RAN control according to Supplementary Note 2.

Proposal 3: Upon DL data arrival at the eNB, RAN2 should discuss whether the UE should be first paged (Option 1) or if direct DL data transmission (Option 2) is preferable (FIG. 10: RAN-controlled DL transmission options).

(2.2.1.2. Paging Area)

If Option 1 of the RAN-controlled DL transmission is selected, it should be further discussed if is the page is performed within a specific area, as in the existing tracking area. The specific area may be just a subset of the tracking area as it's assumed to be group of cells, i.e., the paging area concept already proposed. It's straight forward to introduce such a concept to minimize paging failure. The paging area may be depend on the availability of X2 connectivity for the UE context fetch, mobility state of the UE, spectral efficiency and so on, but this is mostly up to NW implementation.

Proposal 4: RAN2 should introduce the paging area, which consists of a group of cells to send a transmission to page the UE.

It may be assumed that the UE mobility is transparent to the eNB as long as the UE is within the paging area. On the other hand, it should be discussed how the UE behaves when it moves outside of the paging area. To have a reliable paging procedure, there should be a mechanism for the UE to inform the serving cell of its exit condition, much like the existing Tracking Area Update mechanism. It's FFS whether the information is provided before the reselection of an outside cell or after it happens.

Proposal 5: RAN2 should discuss whether the UE should inform the serving cell when it moves outside of the paging area.

(2.2.2. Alternative 2: MME-Controlled Paging)

Figure 11:
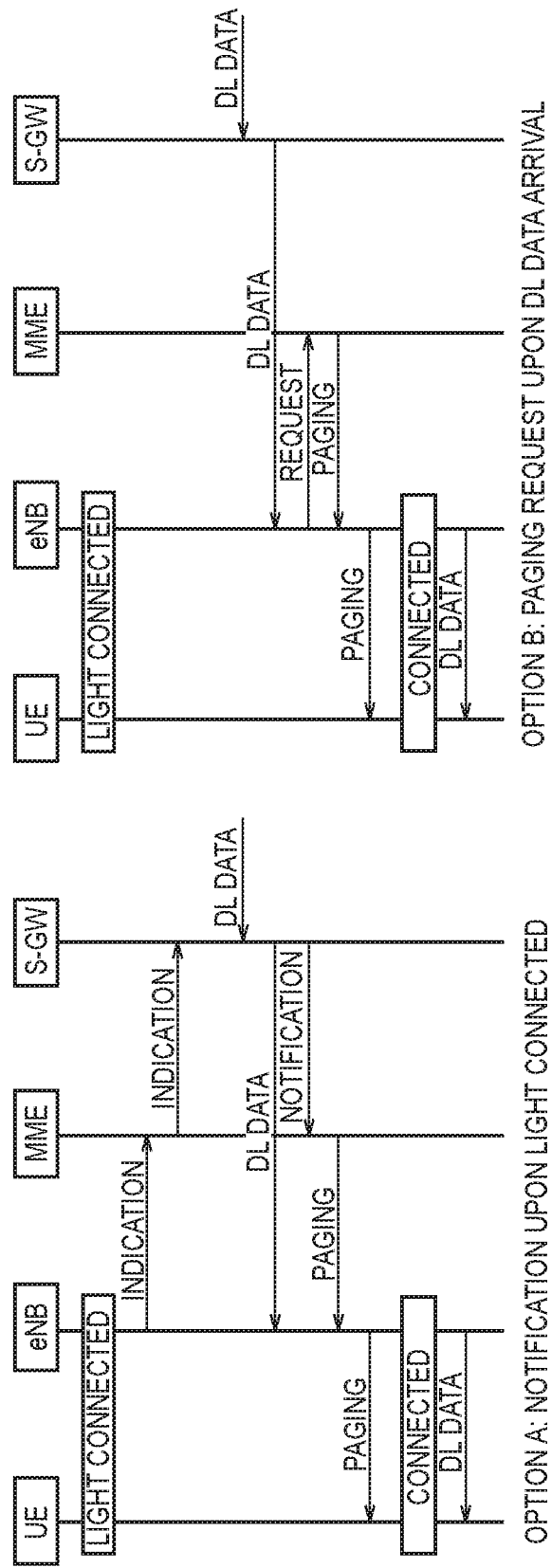
FIG. 11 is a diagram illustrating a signaling option of MME startup paging according to Supplementary Note 2.

Since it isn't clear whether RAN3 will accept RAN2's perspective that RAN initiated paging may be adopted, it's still possible the paging to the UE in Light Connected will need to be initiated by the MME, since the MME has in general the responsibility of mobility management (MM). Assuming the MME still needs to make the final decision, the following options may be considered (FIG. 11: Signalling options of MME-initiated paging).

Option A: The eNB informs the MME when the UE transitions to Light Connected.

With some extensions the eNB and the MME are able to synchronize their knowledge of whether the UE is in Light Connected or not. Furthermore, it may be beneficial to include an update procedure for synchronization of the recommended eNB/cell e.g., if the tracking area-level paging should be avoided considering UE mobility as discussed in section 2.1.1.

Option B: The eNB sends a "paging request" to the MME when DL data to the UE in Light Connected arrives.

With this option, the eNB only sends an indication to the MME when the paging is necessary. In other words, the frequent indications in Option A, i.e., IDLE←→Light Connected←→Connected messaging may be avoided. It may also prevent the potential CN impacts pointed out in [13], i.e., between the MME and the S-GW. As in the case for Option A, the paging request may contain the recommended eNB/cell, similar to the paging optimization in Rel-13, in order to assist the MME in limiting the scope of the S1 PAGING. However, it's questionable if it can really reduce the signalling and latency from S1's perspective.

Regardless of the options, the paging optimization should be reused when the MME-initiated paging is chosen. With some enhancements as discussed above, the MME may use up-to-date information of the recommended eNB/cell when it initiates PAGING, while it's currently provided only in UE CONTEXT RELEASE COMPLETE [5]. It could facilitate the MME to narrow down the scope of PAGING, i.e., the number of target eNBs, so it's still beneficial for signalling reduction from S1's point of view.

Observation 4: It's still possible to have the paging enhancements on top of the paging optimizations introduced in Rel-13 if the MME-initiated paging is chosen.

From RAN2 point of view, the issues discussed in section 2.1.1 may be avoided if the eNB knows the UE's location and/or mobility status, e.g., by means of a notification from the UE upon cell reselection, whereby the recommended eNB/cell may be associated with the RAN-based paging area discussed in section 2.2.1.2 (FIG. 12: Paging Area and Recommended Cells). So, it's worth discussing how the eNB knows the location of the UE even in IDLE, to prevent unnecessary pages. It may be solved by the combination of the paging area, i.e., Proposal 7, and the information, i.e., Proposal 8.

Proposal 6: Even if the MME-initiated paging is chosen, RAN2 should discuss if it's useful for the NW to know the location and/or mobility status of UEs in IDLE or Light Connected, when Rel-13 paging optimization is performed.

The invention claimed is:

1. A user equipment configured for dual connectivity for a mobile communication system, comprising:
   a receiver configured to receive, from a base station, an RRC (Radio Resource Control) connection release message including first information for suspending an RRC connection of the user equipment and for suspending the dual connectivity; and
   a controller configured to cause the user equipment to transition to an RRC inactive state in response to receiving the first information, wherein
   the controller is configured to suspend the dual connectivity while maintaining configuration information of the dual connectivity, based on the first information, and
   the controller is configured to transmit an RRC connection resume request message, to the base station,
   the receiver is configured to receive an RRC resume message including information indicating that the user equipment shall restore the dual connectivity,
   the controller is configured to
      in response to receiving the RRC resume message including the information indicating that the user equipment shall restore the dual connectivity, cause the user equipment to transition to an RRC connected state, and reestablish the dual connectivity based on the maintained configuration information of the dual connectivity.

2. A processor for a user equipment configured for dual connectivity in a mobile communication system, configured to cause the user equipment to:
  receive, from a base station, an RRC (Radio Resource Control) connection release message including first information for suspending an RRC connection of the user equipment and for suspending the dual connectivity; and
  cause the user equipment to transition to an RRC inactive state in response to receiving the first information, wherein
  the processor is configured to suspend the dual connectivity while maintaining configuration information of the dual connectivity, based on the first information, and the processor is further configured to cause the user equipment to
  transmit an RRC connection resume request message, to the base station,
  receive an RRC resume message including information indicating that the user equipment shall restore the dual connectivity,
  in response to receiving the RRC resume message including the information indicating that the user equipment shall restore the dual connectivity, cause the user equipment to transition to an RRC connected state, and
  reestablish the dual connectivity based on the maintained configuration information of the dual connectivity.

* * * * *